(12) United States Patent
Albrecht (10) Patent No.: US 8,790,112 B2
(45) Date of Patent: Jul. 29, 2014

(54) DEVICE AND METHOD FOR MANUFACTURING PLASTIC CONTAINERS

(75) Inventor: Thomas Albrecht, Beilngries (DE)

(73) Assignee: Krones AG, Neutraubling (DE)

( * ) Notice: Subject to any disclaimer, the term of this patent is extended or adjusted under 35 U.S.C. 154(b) by 263 days.

(21) Appl. No.: 13/010,939

(22) Filed: Jan. 21, 2011

(65) Prior Publication Data

US 2011/0175260 A1    Jul. 21, 2011

(30) Foreign Application Priority Data

Jan. 21, 2010 (DE) .............................. 102010001096

(51) Int. Cl.
*B29C 49/02* (2006.01)
*B29C 49/06* (2006.01)

(52) U.S. Cl.
USPC ............ 425/524; 425/528; 425/529; 425/533

(58) Field of Classification Search
CPC ................ B29C 49/061; B29C 49/064; B29C 2049/028
USPC .................................. 425/524, 528, 529, 533
See application file for complete search history.

(56) References Cited

U.S. PATENT DOCUMENTS

| | | | | |
|---|---|---|---|---|
| 688,924 A | * | 12/1901 | Blair et al. .......................... 65/79 |
| 2,913,762 A | * | 11/1959 | Knowles ........................ 425/533 |
| 3,002,225 A | * | 10/1961 | Herbert .......................... 425/533 |
| 3,084,382 A | * | 4/1963 | Stuchbery ....................... 425/532 |
| 3,170,971 A | * | 2/1965 | Ninneman et al. ............. 264/537 |
| 3,330,894 A | * | 7/1967 | Valyi ............................. 425/533 |
| 3,336,425 A | * | 8/1967 | Valyi ............................. 425/524 |
| 3,337,910 A | * | 8/1967 | West .............................. 425/533 |
| 3,470,282 A | * | 9/1969 | Anthony ........................ 425/529 |
| 3,809,517 A | * | 5/1974 | Schneider ...................... 425/533 |
| 3,881,855 A | * | 5/1975 | Farkas .......................... 425/533 |
| 4,039,641 A | | 8/1977 | Collins |
| 4,040,233 A | * | 8/1977 | Valyi ............................. 425/524 |
| 4,287,150 A | | 9/1981 | Gendron |
| 2008/0029928 A1 | * | 2/2008 | Andison et al. ............... 264/238 |

FOREIGN PATENT DOCUMENTS

| | | |
|---|---|---|
| DE | 2125821 A1 | 12/1972 |
| DE | 3439601 A1 | 5/1985 |
| DE | 4323577 A1 | 1/1995 |
| DE | 19737697 A1 | 3/1999 |
| FR | 2488547 A1 | 2/1982 |
| GB | 1174835 | 12/1969 |
| GB | 1389455 A | 4/1975 |
| GB | 2149341 A | 6/1985 |
| WO | WO-9502497 A1 | 1/1995 |
| WO | WO-9847770 A1 | 10/1998 |
| WO | WO-2004026560 A1 | 4/2004 |
| WO | WO 2007107822 A2 * | 9/2007 |

OTHER PUBLICATIONS

European Search Report for EP 10 19 5155, dated Jan. 8, 2013.
German Search Report for DE 10 2010 001 096.0 mailed Sep. 5, 2011.
European Search Report for Application No. EP10195155.6 dated Jan. 7, 2014.

* cited by examiner

*Primary Examiner* — Robert B Davis
(74) *Attorney, Agent, or Firm* — Marshall, Gerstein & Borun LLP (57) ABSTRACT

A device and a method for manufacturing plastic containers, where a preform is manufactured in a casting mold and finished in a blow mold, and to ensure a constructively simple realization and an improved temperature control, the casting mold and the blow mold are lined up to form a mold complex.

14 Claims, 11 Drawing Sheets

DEVICE AND METHOD FOR MANUFACTURING PLASTIC CONTAINERS

CROSS-REFERENCE TO RELATED APPLICATION

The present application claims the benefit of priority of German Application No. 102010001096.0, filed Jan. 21, 2010. The entire text of the priority application is incorporated herein by reference in its entirety.

FIELD OF THE DISCLOSURE

The disclosure relates to a device and a method for manufacturing plastic containers.

BACKGROUND

A device of this type is known from DE 197 37 697 A1. The prior device comprises a casting mold in the form of an injection mold, in which a plastic blank, a so-called preform, is manufactured. In the blow mold this preform is blown to form the finished container. There are provided a plurality of casting molds, which are disposed on preferably two injection mold rotors, which move past an extruder one after the other, which fills the injection molds with liquid plastic. Next, the preforms formed in the injection molds are transferred to a transfer rotor, The transfer rotor then transfers the preforms to a blow molding rotor, which is provided with a plurality of circumferential blow molds. Each preform is inserted into a blow mold and blown to form the finished container.

The blowing is preferably accomplished by means of a stretching rod, which stretches the preform in an axial direction, while the introduced compressed gas (usually air) entails a radial stretching of the preform. Stretching rods are commonly used for the manufacture of plastic containers and are described, for instance, in U.S. Pat. No. 4,039,641.

One problem involved by the transfer of the injection molded preform to the blow mold is the temperature control, which is never exactly definable because the preforms, when being transferred, are exposed to exterior conditions that vary according to the ambient conditions (outside temperature). Therefore, it is safer to let the preforms cool down and provide a heater for heating the preforms to a predetermined temperature for the blowing process. In addition, the prior device is very complex with regard to its construction and requires plenty of floor space.

SUMMARY OF THE DISCLOSURE

The disclosure is based on the object to provide a device and a method for manufacturing plastic containers, which has a constructively simply design and permits a controlled temperature control.

Due to the embodiment according to the disclosure the preform can be transferred directly between the two molds, that is, between the casting mold and the blow mold, without being exposed to ambient conditions in the meantime. Thus, the predetermined blowing temperature can be exactly maintained, without the need for an interim heating. Moreover, the mold complex according to the disclosure can be disposed on a single transport device, preferably on a rotor, so that the required floor space is at least half the size.

Another constructive advantage resides in the fact that the inner mold or the outer mold required for manufacturing the preform can assume a plurality of functions both in the casting mold and particularly also in the blow mold. For instance, the inner mold may assume the function of an ejector or the transfer device between the molds. Additionally, or alternatively, the inner mold may also be employed as a stretching mandrel and/or as a blowing lance in the blow mold. Finally, it is even possible to use the inner mold or the outer mold for feeding a product to be filled into the container after the blowing process, so that both the manufacture of the containers and the filling thereof can be accomplished on the same transport device (rotor). Also, a return air pipe for the filling process may be located either in the inner mold or the outer mold.

By arranging a temperature control device in the casting mold, the same can be heated additionally or cooled more strongly at the appropriate places, so that the preform can be provided with a predetermined temperature profile.

Furthermore, the inner mold may be provided with a cooling device, by means of which, for instance, the places to be stretched to a smaller extent during the blowing process can be cooled. This applies, for instance, to the orifice region of the preform, where dimensional stability is required.

The disclosure can be realized with any type of casting mold, especially with the two most conventional casting molds, i.e. an injection mold or a pressing mold.

Embodiments of the disclosure shall be explained in more detail below by means of the drawings. In the drawings.

DETAILED DESCRIPTION OF THE PREFERRED EMBODIMENT

Figure 1:
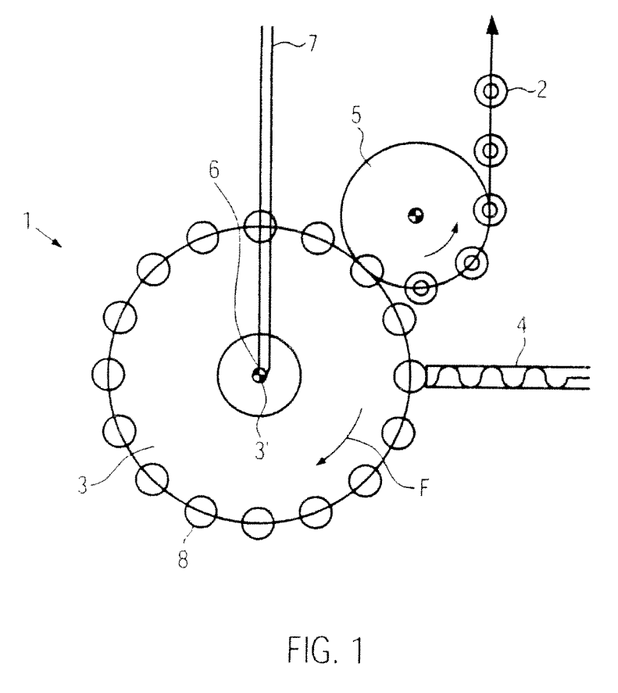
FIG. 1 shows a schematic top view of the disclosed device.

FIG. 1 shows an extremely schematic representation and top view of a device 1 for manufacturing containers 2 of plastic, in the embodiment shown bottles, especially of PET, The device 1 comprises a continuous conveyor system, specifically a carrousel or rotor 3, respectively, which is rotatably driven around an axis 3' in the conveying direction F and initially rotates past a feeding device 4 for liquid plastic, specifically an extruder, and then to a conveyor 5, by means of which finished containers 2 are withdrawn from the rotor 3 and are transported away. Moreover, the rotor 3 is assigned a filling device comprising, for instance, a revolving distributor 6 and a feed line 7. The components described above are of a conventional type. However, the assignment of a feeding device for liquid plastic and component parts of a filling device have so far not yet been combined in a single rotor.

The rotor 3 is provided with a plurality of mold complexes 8 on its circumference, which are explained in more detail in the accompanying drawings.

Figure 2:
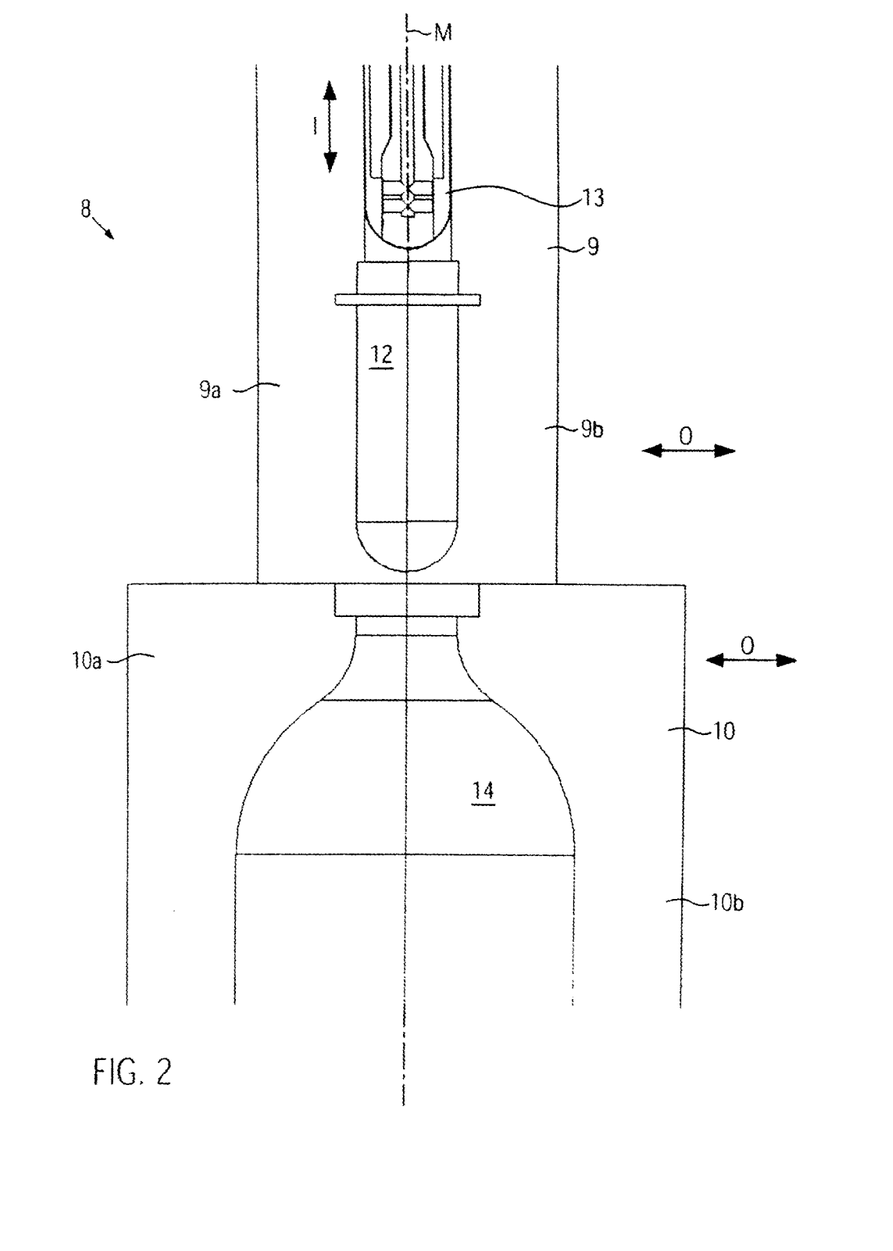
FIG. 2 shows a mold complex of the device.

FIG. 2 shows a partial representation of such a mold complex 8, comprising a casting mold 9 and a blow mold 10. The casting mold 9 and the blow mold 10 are lined up coaxially with respect to each other along a common center line M and in vertical direction. The casting mold 9 and the blow mold 10 directly abut against each other, that is, there is no transfer or conveying distance with a prevailing ambient atmosphere between the two molds 9, 10. With respect to the respective center lines the lining up could also be realized in an angular manner or offset from each other.

The casting mold 9 serves the manufacture of a preform 11 (FIG. 4) as is commonly used for the manufacture of plastic containers. A "preform" is a massive hollow body which only has an orifice and no welding seams (e.g. for welding the opposite side) and of which preferably those parts that have to correspond to each other on the finished containers 2 as dimensionally stable as possible are already fully preformed. These dimensionally stable parts are, for instance, a neck portion 11b for receiving a closure (e.g. a screw neck, a closing collar or a flange edge) and a so-called collar 11c, with which the finished container is to be fitted into and transported in holding devices or conveyors or the like later.

As is shown in FIG. 2 the casting mold 9 is formed as an injection mold and comprises a first mold half 9a and a second mold half 9b, which can be moved apart from each other in the direction of the double arrow O for opening the casting mold 9 and which can be reassembled. The casting mold 9 is divided along a plane that includes the center line M. The mold halves 9a, 9b each enclose half of a hollow space 12 and form the outer mold, which defines the outer shape of the preform 11.

The inner shape of the preform is defined by an inner mold 13, which can immerse into the hollow space 12 in the direction of the arrow I along the center line M and can be drawn out of it. If the inner mold 13 is positioned in the hollow space 12 it has an all-around distance to the hollow space 12, thereby defining the wall thickness of the preform 11, as can be seen in more detail in FIG. 3.

Figure 3:
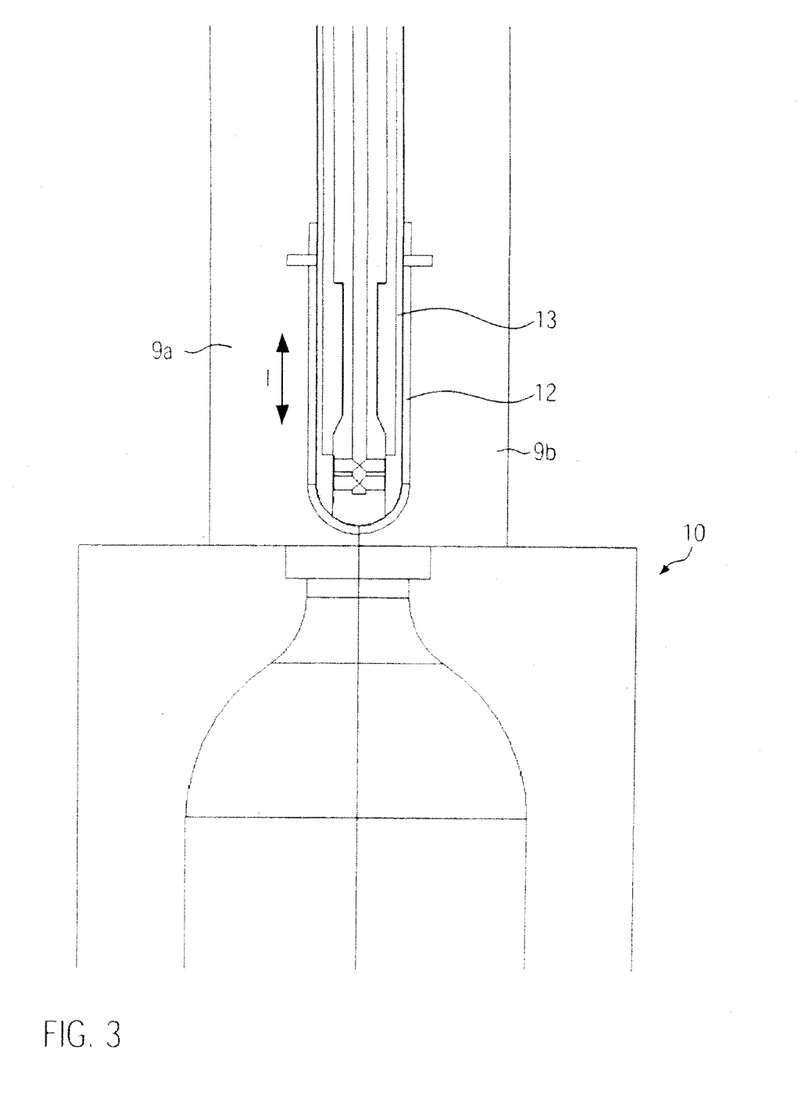
FIG. 3 shows the mold complex of FIG. 2 in another method step.

The blow mold 10 likewise comprises at least two blow mold parts 10a, 10b, which are separated in the plane of the center line M and enclose a hollow space 14 that defines the outer shape of the finished container 2. The mold parts 10a, 10b of the blow mold 10, too, can be opened and closed in the direction of the arrow O.

Figure 4:
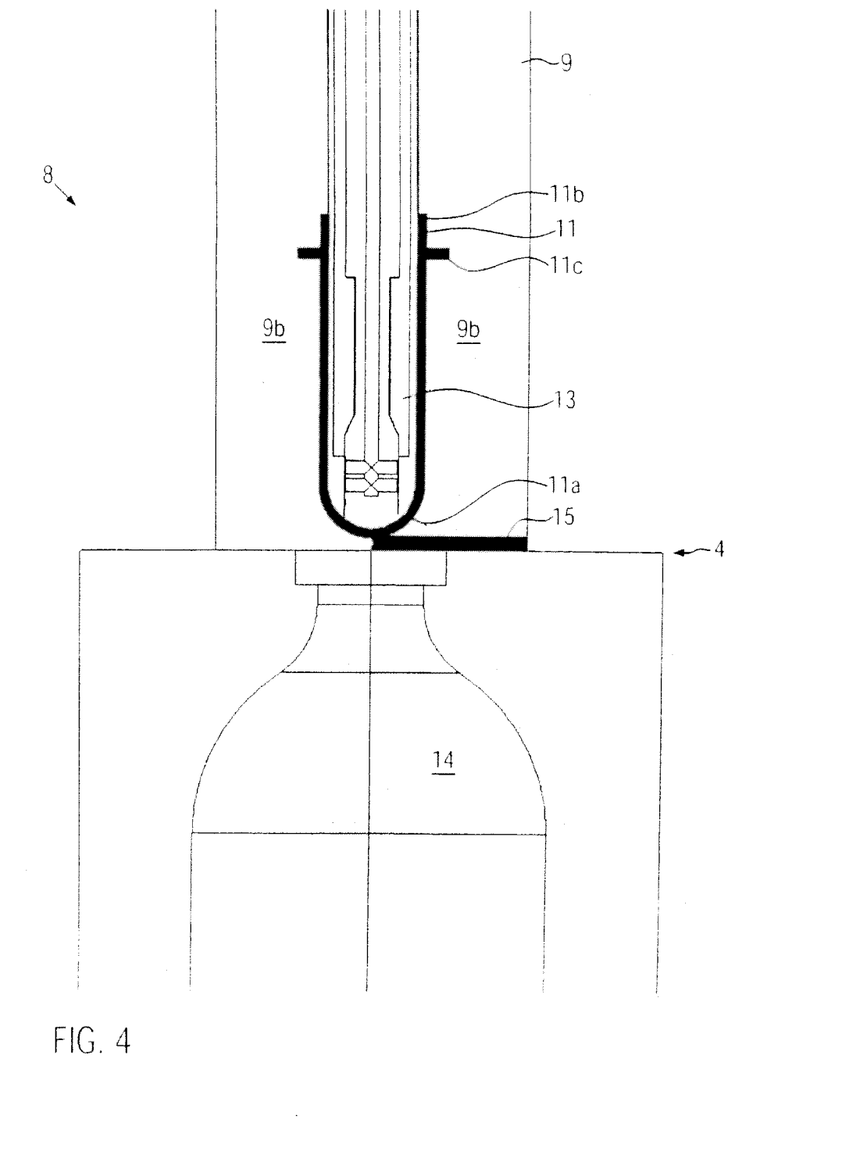
FIG. 4 shows the mold complex of FIG. 2 in another method step.

If a mold complex 8 is located in the region of the plastic feeder 4, liquid plastic is pressed into the casting mold 9 through a filling section 15, as is shown in FIG. 4, until the hollow space 12 defined by the outer mold 9a, 9b and the inner mold 13 is completely filled. The introduction of the plastic is accomplished by an injection.

Figure 5:
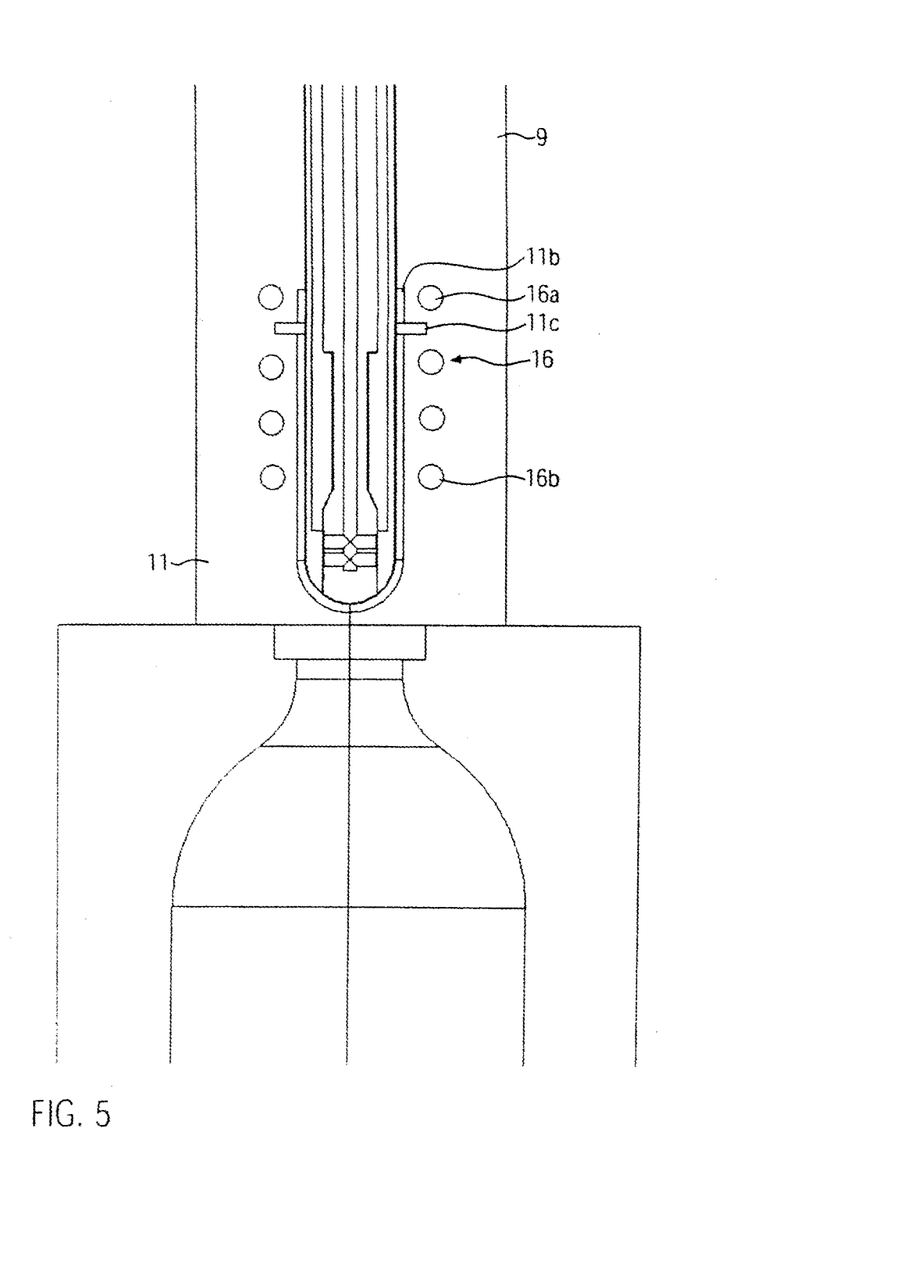
FIG. 5 shows the mold complex of FIG. 2 in another method step.

As is shown in FIG. 5, the injection mold 9 is provided with a temperature control device 16, by means of which the preform 11 now located in the casting mold 9 can be provided with a desired temperature profile. For instance, by means of a cooling device 16a, which is provided in certain sections, the regions on the neck 11b and the collar 11c, which have to remain dimensionally stable, can be cooled to a temperature at which the plastic material used cannot be stretched or extended, or only by applying a substantially increased force. In other regions, e.g. in region 16b, the preform 11 may be heated or maintained at a temperature.

Figure 6:
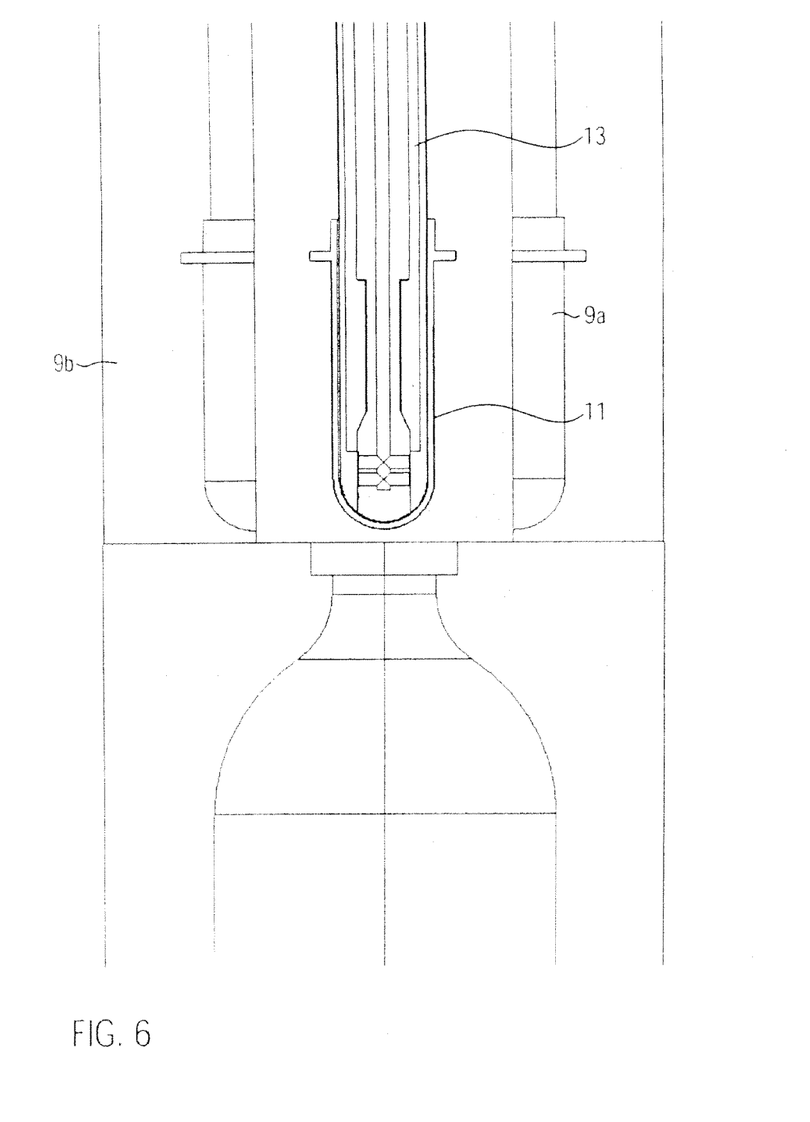
FIG. 6 shows the mold complex of FIG. 2 in another method step.

Subsequently, the mold halves 9a and 9b are moved apart, as can be seen in FIG. 6, and release the preform 11 sitting on the inner mold 13.

Figure 7:
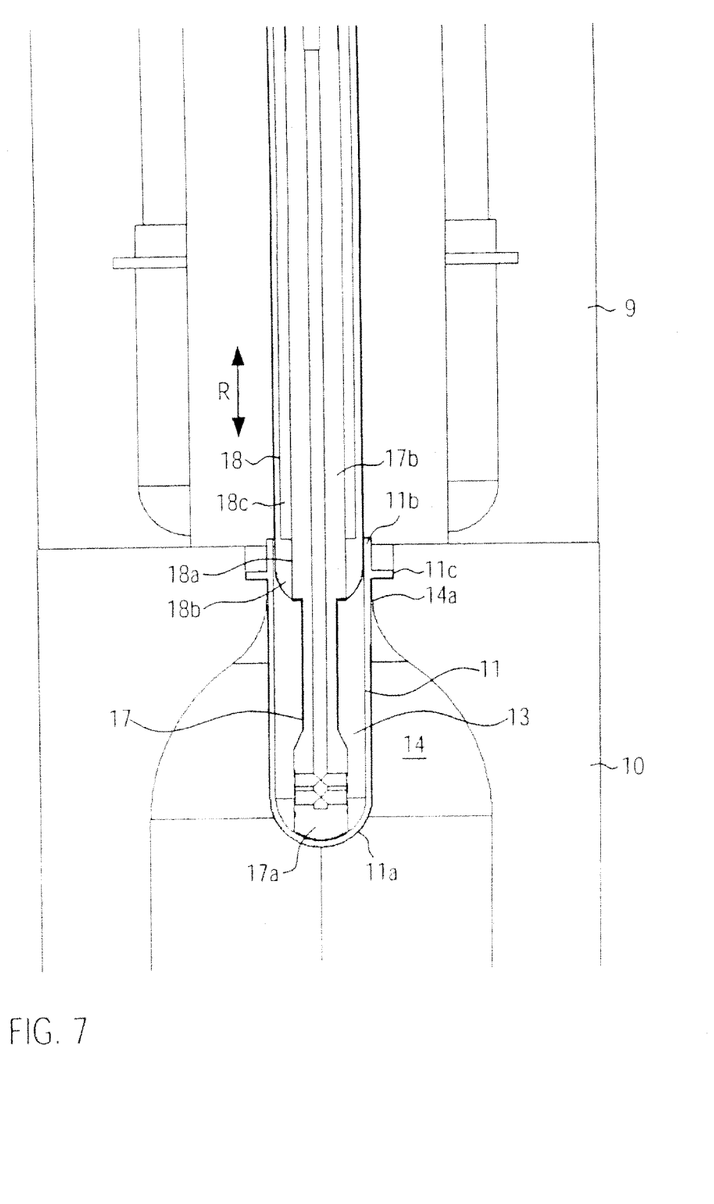
FIG. 7 shows the mold complex of FIG. 2 in another method step.

The inner mold 13 of the casting mold 9 is designed for a plurality of other functions. After the casting mold 9 is opened, the inner mold 13 moves as transfer device from the region of the casting mold 9 downwards into the region of the blow mold, which can be seen in a comparison of FIG. 6 with 7. In the embodiment shown, the hollow space 14 defined by the blow mold 10 is dimensioned such that the preform 11 can be inserted (through the later feed opening 14a of the container 2) into the hollow space 14 without opening the blow mold 10. In other embodiments, however, the blow mold 10, too, can be opened to receive the preform 11.

The inner mold 13 moves into the hollow space 14 of the blow mold 10 until the preform 11 can be positioned in the correct blowing position in the manner described below.

The inner mold 13 comprises a stretching rod 17 commonly used for blow molding, which, in the embodiment shown, is received in an outer sleeve 18. The stretching rod 17 is disposed in the outer sleeve 18, coaxially with respect to the center line M, and can be moved relative to it. The outer side of the outer sleeve serves the formation of the inner side of the preform 11 and, in the embodiment shown (see FIG. 7 or 8), is moved into the hollow space 14 of the blow mold 10 at least as far as the neck portion. The stretching rod 17 is then axially displaced relative to the sleeve 18 in the direction of the double arrow R along the center line M, emerges from an opening 18a in the head 18b of the sleeve in a sealing manner and strips the preform 11 from the inner mold 13 into the hollow space 14. Outside the head 18b a hollow space 18c is provided between the stretching rod 17 and the sleeve 18, through which, for instance, a coolant can be introduced, which cools the head 18b of the sleeve 18 and, thus, the parts 11b, 11c that are adjacent thereto and have to remain dimensionally stable.

Figure 8:
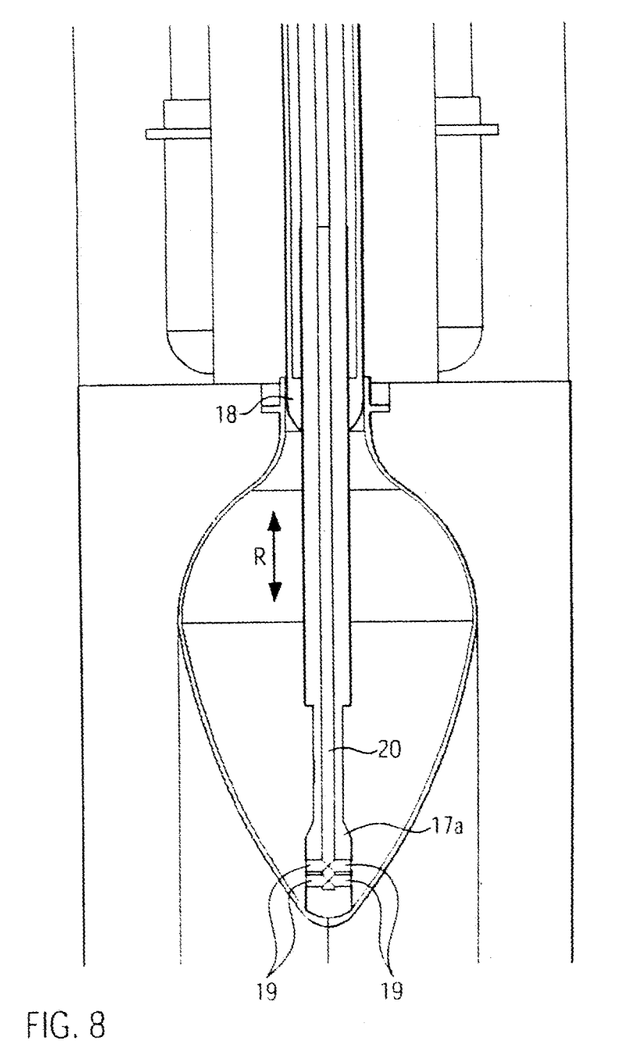
FIG. 8 shows the mold complex of FIG. 2 in another method step.
Figure 9:
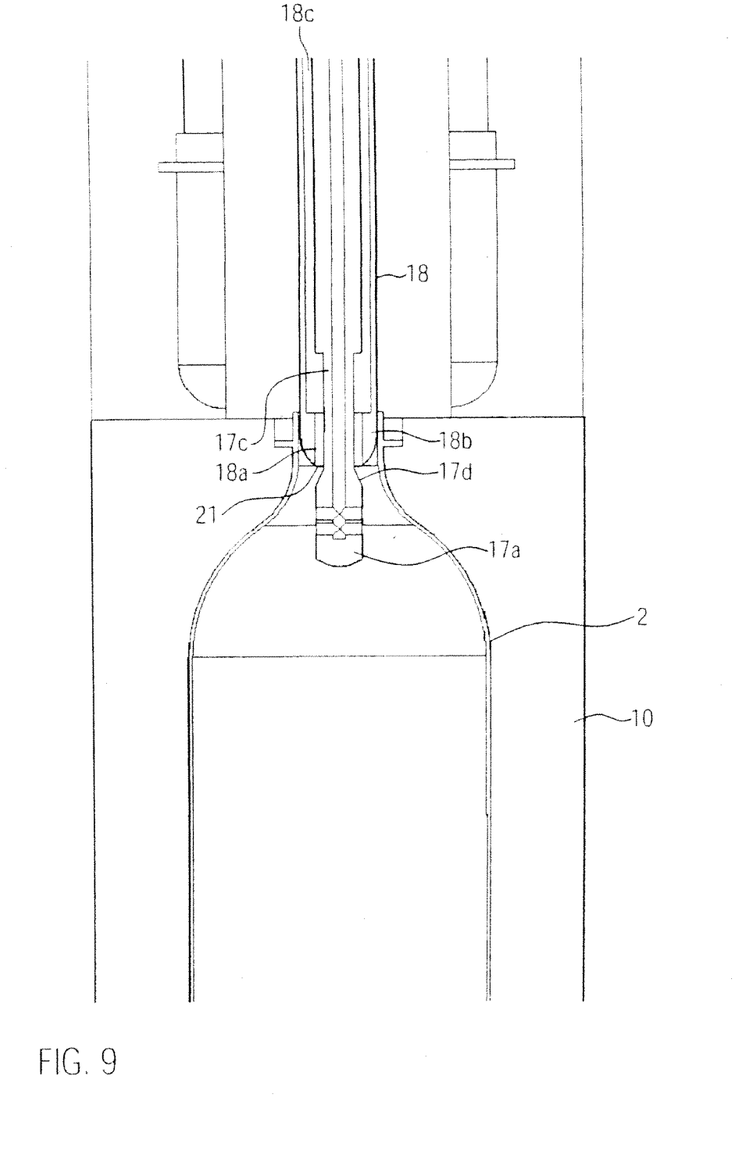
FIG. 9 shows the mold complex of FIG. 2 in another method step.
Figure 10:
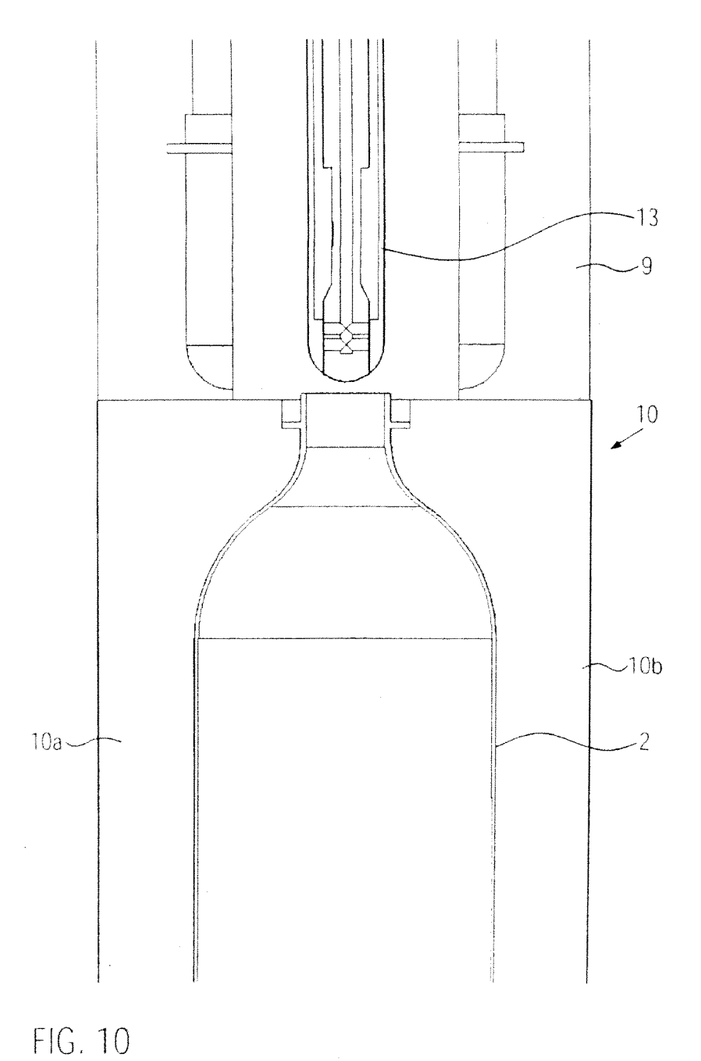
FIG. 10 shows the mold complex of FIG. 2 in another method step.

The stretching rod 17 is provided in a manner known per se with a head 17a adapted to the bottom 11a of the preform 11, by means of which the bottom 11a can be stretched by further extending the stretching rod 17 in the axial direction with respect to the center line M, which is shown in FIG. 8.

Another function of the inner mold 13 is its embodiment as a blowing lance, whereby it is the stretching rod 17 that is provided with air outlet openings 19 in its head 17a, which come out transversely with respect to the center line M and are supplied with blow gas, either compressed air or another pressurized gas, in the usual manner through a supply line 20. Compressed gas is introduced through these outlet openings 19 into the interior of the preform 11 until, with the support of the stretching rod 17, all sides of the preform 11 lie against the inner walls of the hollow space 14 of the blow mold halves 10a, 10b and the container 2 has thus received its final shape.

Apart from a stronger portion 17b, which comprises the head 17a and is capable of sealing the opening 18a of head 18b of the sleeve 18, the stretching rod 17 has a narrower portion 17c in the axial direction, whose outer width is smaller than the opening 18a of head 18b of the sleeve 18. When the container 2 has received its final shape the stretching rod 17 is retracted into the sleeve 18 until the narrow portion 17c comes to rest inside the opening 18a of the sleeve head 18b. The narrower portion 17c merges via an oblique surface 17d into the stronger portion 17b of the stretching rod 17, so that, depending on the position of the oblique surface 17d, there remains an annular gap 21 between the narrow portion 17c and the opening 18, which annular gap 21 serves as a filling valve and has an adjustable flow cross-section. If a product is now filled into the hollow space 18c inside the sleeve 18, it emerges through the annular gap 21 and fills the container 2. Thus, the inner mold 13 can also be used as a filling device.

Preferably, the casting mold 9 is movable relative to the blow mold 10, so that it can clear the space above the blow mold 10. By this it is possible to close the container 2 with an appropriate closing means while it is still located in the blow mold 10. The container is released from the blow mold 10 by opening the blow mold halves 10a, 10b after the inner mold 13 has completely retired into the casting mold 9. The containers 2 are picked up by the conveying rotor 5 and are transported away, while the casting mold 9 is closed again around the inner mold 13 and is ready for another injection molding process.

Figure 11:
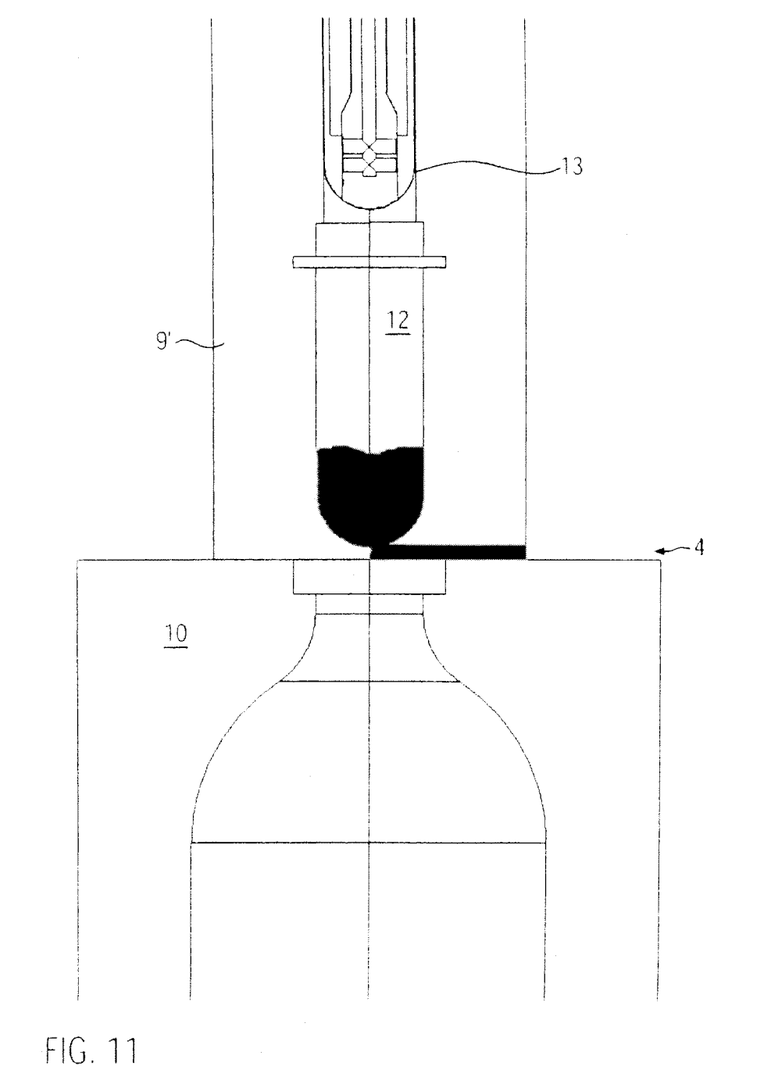
FIG. 11 shows an alternative mold complex.

Instead of the injection mold, the casting mold 9 may also be designed as a pressing mold for press molding, as is shown in FIG. 11. To this end, the inner mold 13, which is incidentally designed in the same way as in the first embodiment, is completely withdrawn from the hollow space 12 prior to filling in liquid plastic, and an exactly proportioned quantity of liquid plastic is introduced into the hollow space 12. If the inner mold 13 is then lowered into the hollow space 12 until is has a uniform distance from the hollow space 12 on all sides, the liquid plastic is distributed uniformly, and the preform 11 shown in FIG. 4 is obtained.

Thus, the described mold complex 8 according to the disclosure permits the direct transfer of the preform from the heat of the casting mold to the blow mold, so that a defined temperature can be maintained. Moreover, also the predetermined temperature profile is maintained.

According to a modification of the embodiment as described and drawn the disclosure can also be employed if the container need not or cannot directly be filled in the blow mold. If a filling is not necessary, also a horizontal, side-by-side arrangement could be possible instead of the described arrangement of casting mold and blow mold on top of each other, provided that both molds are arranged coaxially with respect to each other so that a direct transfer from the casting mold into the blow mold is possible. The function of the inner mold, the stretching rod and the blowing lance may also be accomplished by one single component. The filling of the container may also be accomplished through other portions of the mold complex. In a preferred embodiment the preform or container, respectively, is continuously transported by the blow mold and/or the casting mold. Specifically, the blow mold and/or the casting mold are disposed on a rotating carrousel. In another preferred embodiment the preform or container, respectively, is handled by a stationary blow mold and/or casting mold.

The invention claimed is:

1. Device for manufacturing containers of plastic, comprising a casting mold for manufacturing a preform and a blow mold for finishing the container, and the casting mold and the blow mold are lined up to form a mold complex, wherein the casting mold comprises an inner mold and an outer mold, wherein the inner mold comprises an axially movable sleeve in which at least one of a stretching rod or a blowing air lance is received axially movable relative to the sleeve, and wherein the inner mold or the outer mold is connected to a feed line for filling the container.

2. Device according to claim 1, wherein the casting mold and the blow mold are arranged coaxially with respect to each other.

3. Device according to claim 2, wherein the inner mold of the casting mold is movable in the axial direction both in the casting mold and the blow mold.

4. Device according to claim 3, wherein the inner mold includes a transfer device for transferring the preform from the casting mold into the blow mold.

5. Device according to claim 3 wherein the inner mold includes a stretching mandrel device for the blow mold.

6. Device according to claim 3, wherein the inner mold comprises a blowing air lance for the blow mold.

7. Device according to claim 1, wherein the casting mold is provided with a temperature control device for providing the perform with a predetermined temperature profile.

8. Device according to claim 3, wherein the inner mold is provided with a cooling device.

9. Device according to claim 1, wherein the mold complex is connected to a feed line for filling the container.

10. Device according to claim 1, wherein the feed line is connected to a sleeve of the inner mold, in which a stretching rod and/or a blowing air lance is received axially movable relative to the sleeve and forms with the sleeve an annular gap embodied as a valve.

11. Device according to claim 1, wherein the casting mold is an injection mold.

12. Device according to claim 1, wherein the casting mold is a pressing mold.

13. Device according to claim 1, wherein the mold complex is assigned a closing means for the container.

14. Device for manufacturing containers of plastic, comprising a casting mold for manufacturing a preform and a blow mold for finishing the container, and the casting mold and the blow mold are lined up to form a mold complex, wherein the casting mold comprises an inner mold an outer mold, and wherein a feed line for filling the container is connected to a sleeve of the inner mold, in which at least one of a stretching rod or a blowing air lance is received axially movable relative to the sleeve and forms with the sleeve an annular gap embodied as a valve.

* * * * *